United States Patent
Litzenberg et al.

(10) Patent No.: US 8,202,079 B2
(45) Date of Patent: Jun. 19, 2012

(54) METHOD AND DEVICE FOR BLOW MOLDING CONTAINERS

(75) Inventors: Michael Litzenberg, Geesthacht (DE); Michael Linke, Hamburg (DE); Rolf Baumgarte, Ahrenburg (DE); Frank Lewin, Tangstedt (DE)

(73) Assignee: KHS Corporation GmbH & Co. KG, Hamburg (DE)

( * ) Notice: Subject to any disclaimer, the term of this patent is extended or adjusted under 35 U.S.C. 154(b) by 111 days.

(21) Appl. No.: 12/449,423

(22) PCT Filed: Feb. 7, 2008

(86) PCT No.: PCT/DE2008/000253
§ 371 (c)(1),
(2), (4) Date: Nov. 16, 2009

(87) PCT Pub. No.: WO2008/106921
PCT Pub. Date: Sep. 12, 2008

(65) Prior Publication Data
US 2010/0090376 A1 Apr. 15, 2010

(30) Foreign Application Priority Data
Mar. 7, 2007 (DE) .......................... 10 2007 011 060

(51) Int. Cl.
*B29C 49/36* (2006.01)
*B29C 31/08* (2006.01)

(52) U.S. Cl. .................. 425/534; 198/468.3; 198/470.1; 198/474.1; 198/803.9

(58) Field of Classification Search .................. 425/534, 425/540; 198/464.2, 468.3, 470.1, 474.1, 198/750.8, 803.9; 74/568 R
See application file for complete search history.

(56) References Cited

U.S. PATENT DOCUMENTS

| | | | | |
|---|---|---|---|---|
| 1,742,843 A | * | 1/1930 | Benedict | 74/568 R |
| 1,785,736 A | * | 12/1930 | Hess | 74/568 R |
| 2,107,011 A | * | 2/1938 | Moorshead et al. | 65/223 |
| 2,188,108 A | * | 1/1940 | Dorman | 74/568 R |
| 2,314,303 A | * | 3/1943 | Benoit | 65/264 |
| 2,554,545 A | * | 5/1951 | Winder | 74/568 R |
| 2,945,397 A | * | 7/1960 | Caler et al. | 74/568 R |
| 3,680,406 A | * | 8/1972 | Bush | 74/568 FS |
| 3,975,260 A | | 8/1976 | Peyton et al. | |
| 4,018,151 A | * | 4/1977 | Urban et al. | 101/40 |
| 4,141,680 A | * | 2/1979 | Kauffman et al. | 425/529 |
| 4,355,968 A | * | 10/1982 | Lagoutte et al. | 425/526 |

(Continued)

FOREIGN PATENT DOCUMENTS
DE  23 52 926  4/1975
(Continued)

*Primary Examiner* — Robert B Davis
(74) *Attorney, Agent, or Firm* — Lucas & Mercanti, LLP; Klaus P. Stoffel

(57) ABSTRACT

The method and device are for blow-molding containers. A blank is molded in a blowing mold by means of a blowing pressure after a thermal treatment. The blanks are positioned along a part of the transport path thereof by means of a support element (42) held by a rotating transfer wheel (41). The support element is movably mounted relative to the transfer wheel. The support element is positioned by means of a cam controller (50). The cam controller comprises a positionable cam segment (56) which preselectably places the support element in a working or a resting position. In the working position the support elements are brought into a transfer region and in the resting position are held away from said transfer region.

10 Claims, 7 Drawing Sheets

U.S. PATENT DOCUMENTS 5,881,860 A * 3/1999 Zecchi et al. ............ 198/464.4
6,152,723 A * 11/2000 Winter et al. ............ 425/526

FOREIGN PATENT DOCUMENTS

| | | |
|---|---|---|
| DE | 38 37 118 | 5/1990 |
| DE | 42 12 583 | 10/1993 |
| DE | 43 40 291 | 6/1995 |
| DE | 19810238 A1 * | 5/1999 |
| DE | 199 06 438 | 8/2000 |
| DE | 100 17 050 | 10/2001 |
| FR | 2 867 171 | 9/2005 |
| FR | 2 872 805 | 1/2006 |
| FR | 2 895 384 | 6/2007 |
| WO | 2006/005694 | 1/2006 |
| WO | 2007/077320 | 7/2007 |

* cited by examiner

METHOD AND DEVICE FOR BLOW MOLDING CONTAINERS

The invention concerns a method for blow molding containers, in which a preform is first subjected to thermal conditioning and then molded into a container in a blow mold by the action of blowing pressure, and in which the preforms are positioned by a support element along at least a portion of their conveyance path, such that the support element is held by a rotating transfer wheel, relative to which the support element is movably supported, and in which the support element is positioned by a cam control mechanism.

The invention also concerns a device for blow molding containers, which has at least one blowing station with a blow mold and at least one support element for positioning preforms along a conveyance path, said support element being held by a rotating transfer wheel, relative to which the support element is movably supported, and which device has a cam control mechanism for the support element.

In container molding by the action of blowing pressure, preforms made of a thermoplastic material, for example, preforms made of PET (polyethylene terephthalate), are fed to different processing stations within a blow-molding machine. A blow-molding machine of this type typically has a heating system and a blowing system, in which the preform, which has first been brought to a desired temperature, is expanded by biaxial orientation to form a container. The expansion is effected by means of compressed air, which is fed into the preform to be expanded. DE-OS 43 40 291 explains the process-engineering sequence in this type of expansion of the preform. The aforementioned introduction of the pressurized gas comprises both the introduction of compressed gas into the developing container bubble and the introduction of compressed gas into the preform at the beginning of the blowing process.

The basic structure of a blowing station for container molding is described in DE-OS 42 12 583. Possible means of bringing the preform to the desired temperature are explained in DE-OS 23 52 926.

Various handling devices can be used to convey the preforms and the blow-molded containers within the blow-molding device. The use of transport mandrels, onto which the preforms are slipped, has proven especially effective. However, the preforms can also be handled with other supporting devices. Other available designs are grippers for handling the preforms and expanding mandrels, which can be inserted in the mouth region of the preform to support the preform.

The handling of containers with the use of transfer wheels is described, for example, in DE-OS 199 06 438 with the transfer wheel arranged between a blowing wheel and a delivery line.

The above-explained handling of the preforms occurs, for one thing, in so-called two-step processes, in which the preforms are first produced by injection molding and temporarily stored and then later conditioned with respect to their temperature and blown into containers. For another, the preforms can be handled in so-called one-step processes, in which the preforms are first produced by injection molding and allowed to solidify sufficiently and are then immediately suitably conditioned with respect to their temperature and then blow molded.

With respect to the blowing stations that are used, various embodiments are known. In the case of blowing stations that are arranged on rotating transport wheels, book-like opening of the mold supports is often encountered. However, it is also possible to use mold supports that can be moved relative to each other or that are guided in a different way. In stationary blowing stations, which are suitable especially for accommodating several cavities for container molding, plates arranged parallel to one another are typically used as mold supports.

So-called transfer wheels equipped with support elements for the preforms or blow-molded containers are often used for handling the preforms and for handling the bottles within the blow-molding machine. The support elements can either hold the preforms or bottles directly or convey separate transport elements, which in turn directly hold the preforms or bottles. To support the transfer operations, the support elements are typically pivoted relative to the transfer wheel. In addition, an ability to telescope is often realized. Cam control mechanisms are used to preposition the support elements. To this end, the support elements are guided past stationary cams.

A problem that must be dealt with when these types of transfer wheels equipped with support elements are used is the avoidance of serious damage when mechanical disruptions occur, especially when collisions occur. To this end, it is well known that the support brackets can be supported in the area of the transfer wheels with the use of overload clutches. Overload clutches of this type not only are expensive but also increase the overall weight of the rotating transfer wheels.

It is also already known that the support brackets can be equipped with active positioning elements, which pneumatically or electrically predetermine extension or retraction of the support brackets in such a way that the support brackets are positioned in an operating position or a resting position. However, suitable positioning devices cause relatively high costs and increase the overall weight of the transfer wheel, so that increased inertial properties arise.

Therefore, the objective of the invention is to improve a method of the aforementioned type in such a way that a high degree of operating reliability is achieved with a simple mechanical design.

In accordance with the invention, this objective is achieved by virtue of the fact that the support element can be coupled with a movable part of the cam control mechanism in a way that promotes a high degree of operating reliability with a simple design.

A further objective of the present invention is to design a device of the aforementioned type in a way that promotes a high degree of operating reliability with a simple design.

In accordance with the invention, this objective is achieved by virtue of the fact that the cam control mechanism has a movable cam segment that prepositions the support element either in an operating position or a resting position.

The use of the movable cam segment makes it possible to keep the support elements in a transfer area away from a transfer position. It has been found to be sufficient to position the support elements deviating from a normal operating sequence only in the area of the intended transfer. Along the rest of the conveyance path, the transport elements can follow the cam track intended for a normal operating sequence.

In a normal operating sequence, a transfer wheel is provided with a feed region and a delivery region. It is basically possible to arrange positionable cam segments both in the feed region and in the delivery region. The positionable cam segments can each be coupled with an actuator. In particular, however, it has been found to be sufficient in normal applications to position both movable cam segments together with the use of only one, common actuator.

To obtain a compact design, it is helpful to arrange the movable cam segment at a different height level from a cam track of the cam control mechanism.

To achieve continuous guidance of the support elements, it is helpful if the support element has at least one cam roller for guidance along the cam track and one receiver for guidance along the cam segment.

It is conducive to low-wear operation if a cam roller is used as the receiver.

To preassign a given position of the cam segment, it is proposed that the cam segment be positioned by an actuating element.

It is conducive to the realization of a compact design if the actuating element exerts an essentially radially directed actuating force on the cam segment.

Simple prepositioning of the cam segment can be carried out if the actuating element swivels the cam segment.

The performance of deflection movements in a radially inward direction is made possible if the support element occupies its resting position when the cam segment is positioned radially inward and occupies its operating position when the cam segment is positioned radially outward.

The performance of transfer operations is assisted if a support bracket of the support element is swiveled along its path of movement.

It is also helpful to material handling if a support bracket of the support element is telescoped along its path of movement.

The receiving and delivery of workpieces is facilitated if transfer operations are carried out with the use of tong-like handling elements.

The decoupling of transfer operations is assisted both in a feed region and in a delivery region of the transfer wheel if the support elements are arranged in a predeterminable way in an operating position or in a resting position with the use of positionable cam segments both in a feed region and in a delivery region.

The drawings are schematic representations of specific embodiments of the invention.

Figure 1:
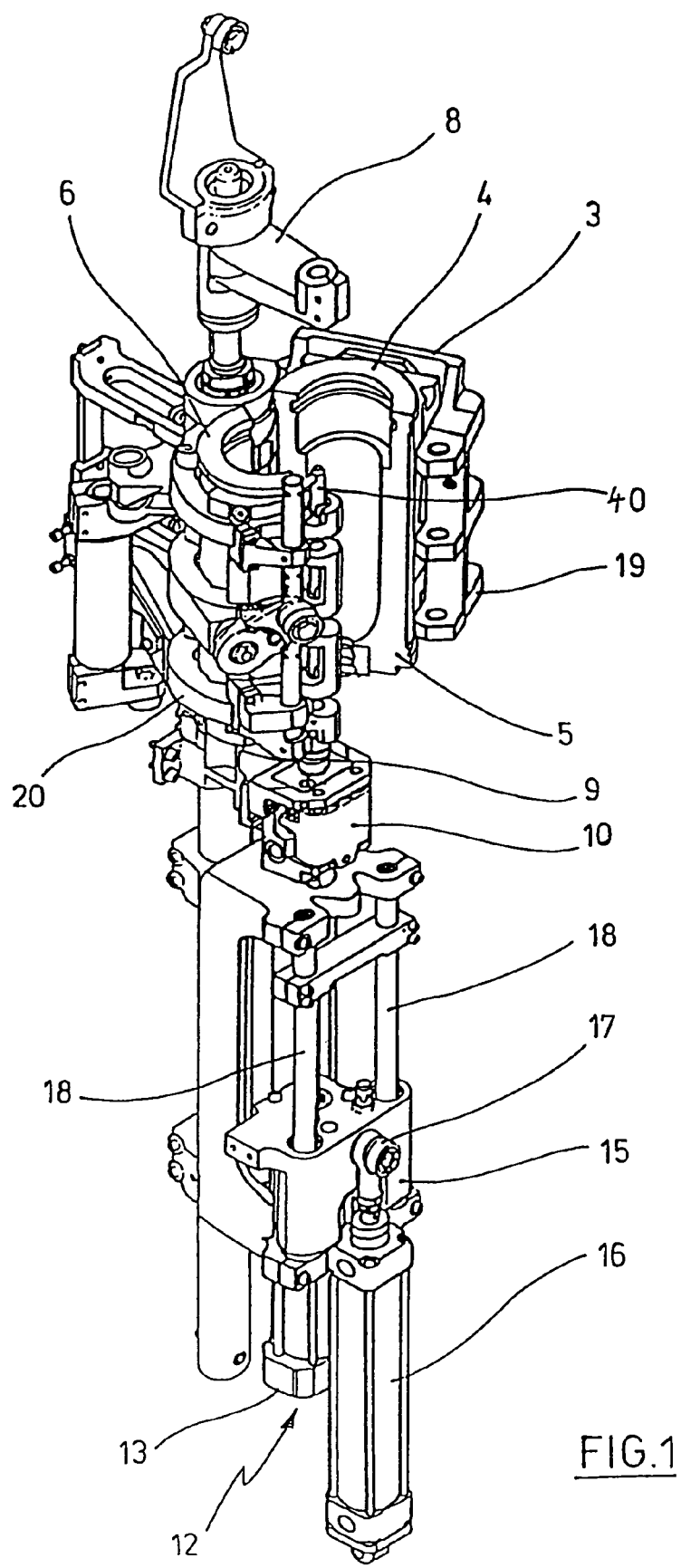
FIG. 1 shows a perspective view of a blowing station for producing containers from preforms.
Figure 2:
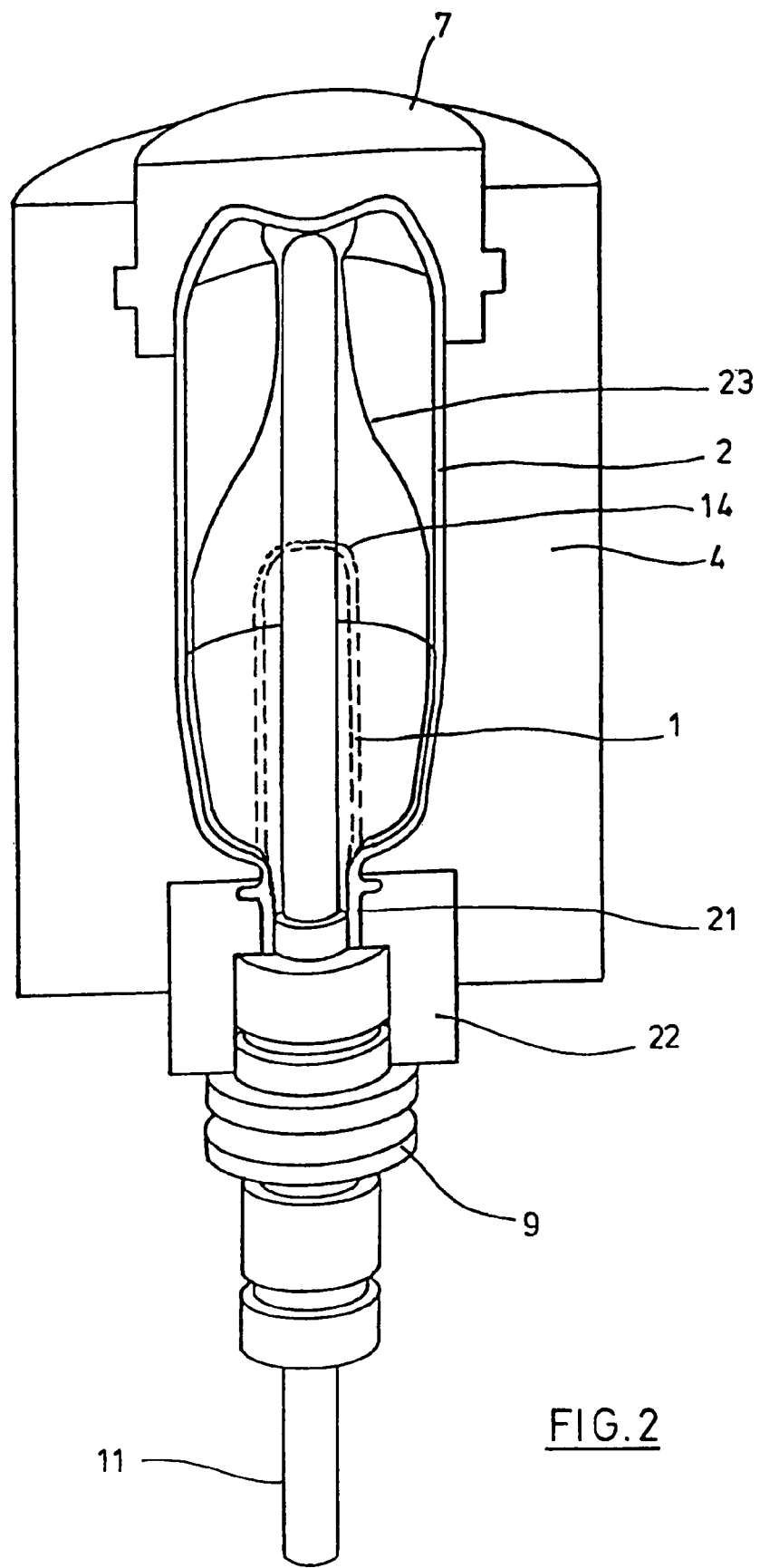
FIG. 2 shows a longitudinal section through a blow mold, in which a preform is stretched and expanded.

FIGS. 1 and 2 show the basic design of a device for shaping preforms 1 into containers 2.

The device for molding the container 2 consists essentially of a blowing station 3, which is provided with a blow mold 4, into which a preform 1 can be inserted. The preform 1 can be an injection-molded part made of polyethylene terephthalate. To allow a preform 1 to be inserted into the blow mold 4 and to allow the finished container 2 to be removed, the blow mold 4 consists of mold halves 5, 6 and a base part 7, which can be positioned by a lifting device 8. The preform 1 can be held in the area of the blowing station 3 by a transport mandrel 9, which, together with the preform 1, passes through a plurality of treatment stations within the device. However, it is also possible to insert the preform 1 directly into the blow mold 4, for example, with grippers or other handling devices.

To allow compressed air to be fed in, a connecting piston 10 is arranged below the transport mandrel 9. It supplies compressed air to the preform 1 and at the same time produces a seal relative to the transport mandrel 9. However, in a modified design, it is also basically possible to use stationary compressed air feed lines.

In this embodiment, the preform 1 is stretched by means of a stretch rod 11, which is positioned by a cylinder 12. In accordance with another embodiment, the stretch rod 11 is mechanically positioned by cam segments, which are acted upon by pickup rollers. The use of cam segments is advantageous especially when a large number of blowing stations 3 is arranged on a rotating blowing wheel.

In the embodiment illustrated in FIG. 1, the stretching system is designed in such a way that a tandem arrangement of two cylinders 12 is provided. Before the start of the actual stretching operation, the stretch rod 11 is first moved into the area of a base 14 of the preform 1 by a primary cylinder 13. During the stretching operation itself, the primary cylinder 13 with the stretch rod extended, together with a carriage 15 that carries the primary cylinder 13, is positioned by a secondary cylinder 16 or by a cam control mechanism. In particular, it is proposed that the secondary cylinder 16 be used in such a way under cam control that a current stretching position is predetermined by a guide roller 17, which slides along a cam track while the stretching operation is being carried out. The guide roller 17 is pressed against the guide track by the secondary cylinder 16. The carriage 15 slides along two guide elements 18.

After the mold halves 5, 6, which are arranged in the area of supports 19, 20, are closed, the supports 19, 20 are locked relative to each other by means of a locking mechanism 20.

To adapt to different shapes of a mouth section 21 of the preform 1, provision is made for the use of separate threaded inserts 22 in the area of the blow mold 4, as shown in FIG. 2.

In addition to the blow-molded container 2, FIG. 2 shows the preform 1, which is drawn with broken lines, and also shows schematically a container bubble 23 in the process of development.

Figure 3:
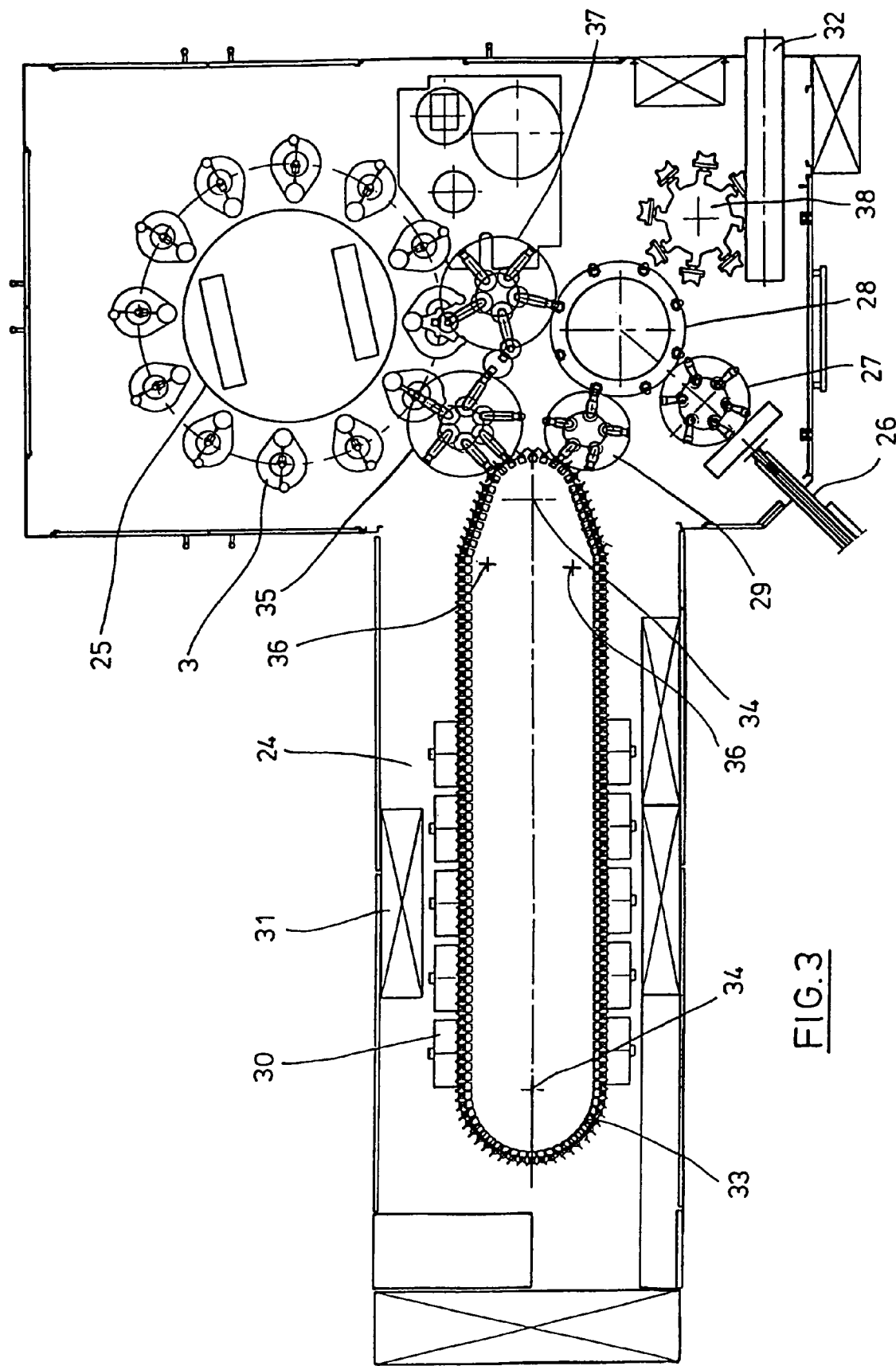
FIG. 3 is a drawing that illustrates a basic design of a device for blow molding containers.

FIG. 3 shows the basic design of a blow-molding machine, which has a heating line 24 and a rotating blowing wheel 25. Starting from a preform feeding device 26, the preforms 1 are conveyed to the area of the heating line 24 by transfer wheels 27, 28, 29. Heating elements 30 and fans 31 are arranged along the heating line 24 to bring the preforms 1 to the desired temperature. After sufficient heat treatment of the preforms 1, they are transferred to the blowing wheel 25, where the blowing stations 3 are located. The finished blow-molded containers 2 are fed to a delivery line 32 by additional transfer wheels.

To make it possible for a preform 1 to be formed into a container 2 in such a way that the container 2 has material properties that ensure a long shelf life of the foods, especially beverages, with which the container 2 is to be filled, specific process steps must be followed during the heating and orientation of the preforms 1. In addition, advantageous effects can be realized by following specific dimensioning specifications.

Various plastics can be used as the thermoplastic material, for example, PET, PEN, or PP.

The preform 1 is expanded during the orientation process by feeding compressed air into it. The operation of supplying compressed air is divided into a preblowing phase, in which gas, for example, compressed air, is supplied at a low pressure level, and a subsequent main blowing phase, in which gas is supplied at a higher pressure level. During the preblowing phase, compressed air with a pressure in the range of 10 bars to 25 bars is typically used, and during the main blowing phase, compressed air with a pressure in the range of 25 bars to 40 bars is supplied.

FIG. 3 also shows that in the illustrated embodiment, the heating line 24 consists of a large number of revolving transport elements 33, which are strung together like a chain and are moved along by guide wheels 34. In particular, it is proposed that an essentially rectangular basic contour be set up by the chain-like arrangement. In the illustrated embodiment, a single, relatively large-sized guide wheel 34 is used in the area of the extension of the heating line 24 facing the transfer wheel 29 and a feed wheel 35, and two relatively small-sized guide wheels 36 are used in the area of adjacent deflections. In principle, however, any other types of guides are also conceivable.

To allow the closest possible arrangement of the transfer wheel 29 and the feed wheel 35 relative to each other, the illustrated arrangement is found to be especially effective, since three guide wheels 34, 36 are positioned in the area of the corresponding extension of the heating line 24, namely, the smaller guide wheels 36 in the area of the transition to the linear stretches of the heating line 24 and the larger guide wheel 34 in the immediate area of transfer to the transfer wheel 29 and to the feed wheel 35. As an alternative to the use of chain-like transport elements 33, it is also possible, for example, to use a rotating heating wheel.

After the blow molding of the containers 2 has been completed, the containers 2 are carried out of the area of the blowing stations 3 by an extraction wheel 37 and conveyed to the delivery line 32 by the transfer wheel 28 and a delivery wheel 38.

Figure 4:
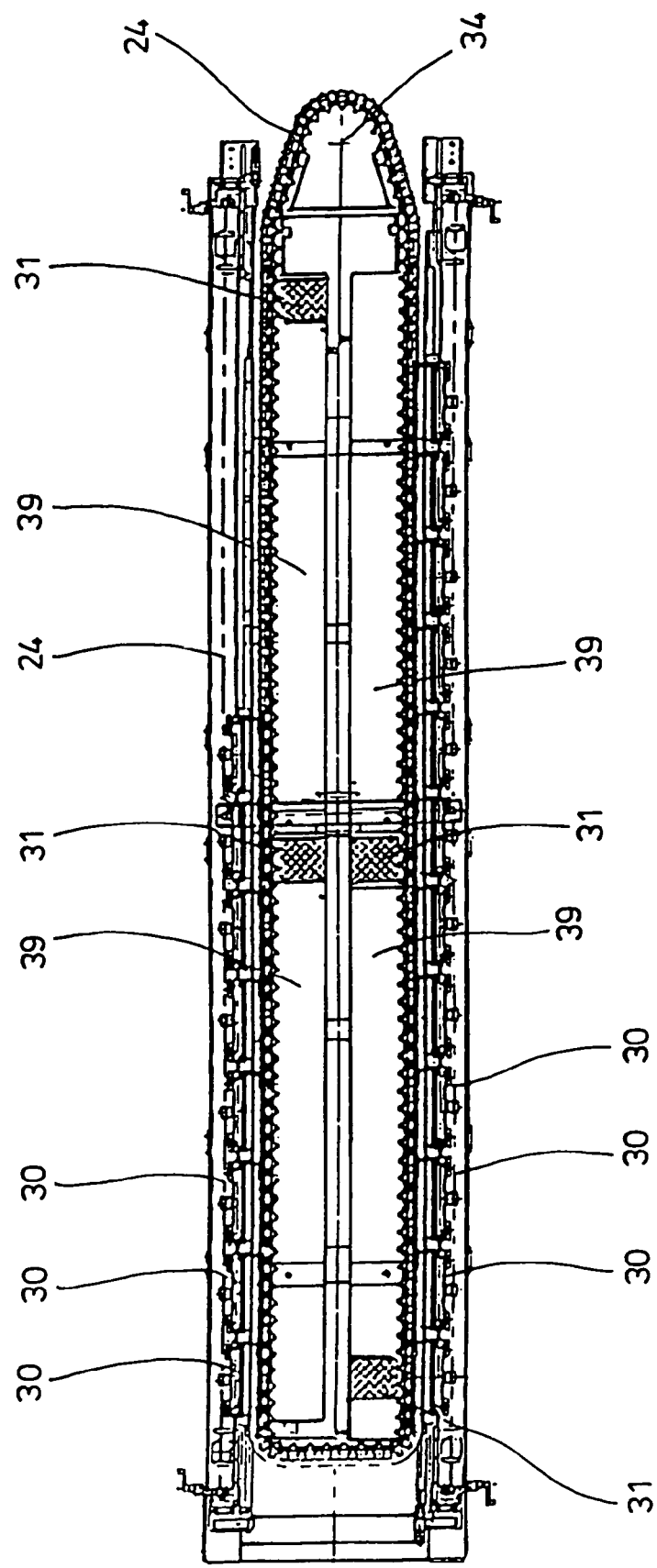
FIG. 4 shows a modified heating line with increased heating capacity.

In the modified heating line 24 illustrated in FIG. 4, a larger number of preforms 1 can be heated per unit time due to the larger number of heating elements 30. The fans 31 in this case feed cooling air into the area of cooling air ducts 39, which lie opposite the associated heating elements 30 and deliver the cooling air through discharge ports. A direction of flow of the cooling air essentially transverse to the direction of conveyance of the preforms 1 is realized by the arrangement of the discharge directions. In the area of surfaces opposite the heating elements 30, the cooling air ducts 39 can provide reflectors for the thermal radiation. It is also possible to realize cooling of the heating elements 30 by the delivered cooling air.

Figure 5:
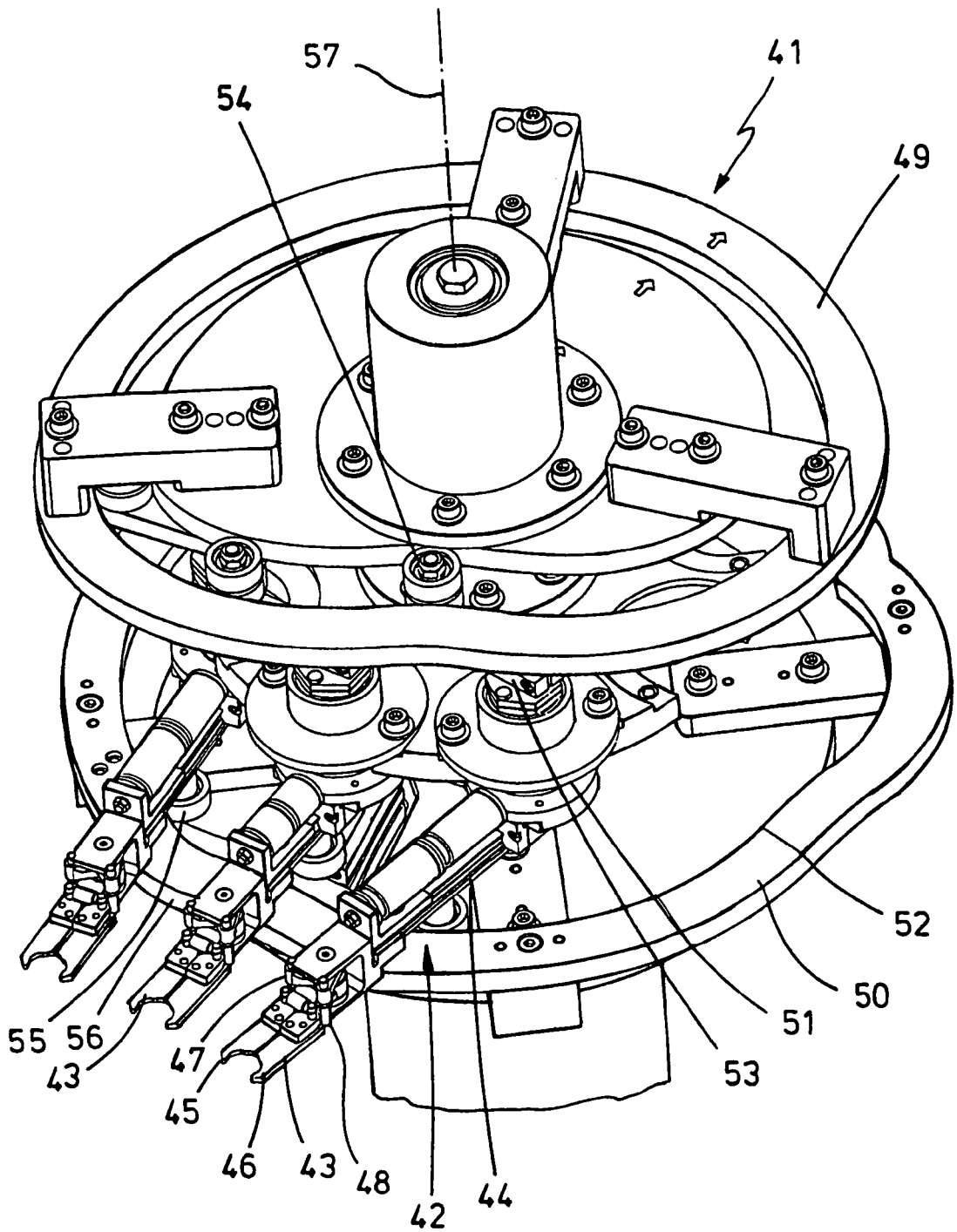
FIG. 5 shows a perspective view of a transfer wheel with a plurality of positionable support brackets.

FIG. 5 shows a transfer wheel 41, which can be installed, for example, at the positions for at least one of the transfer wheels (27, 28, 29). The transfer wheel 41 is provided with support elements 42, which are used for handling preforms 1 and/or containers 2. In the illustrated embodiment, the support element 42 consists of a handling element 43 and a support bracket 44. In the illustrated embodiment, the handling element 43 is designed as a gripper with two gripper arms 45, 46, which are mounted on the support bracket 44 in such a way that they can swivel relative to axes of rotation 47, 48. Handling elements 43 of this type grasp the preforms 1 or containers 2 directly. However, the handling elements 43 can also be realized in such a way that contact is provided with transport elements, which in turn support the preforms 1 or containers 2. A transport element of this type can be realized, for example, as a transport mandrel 9, on which the preform is placed or in which the mouth area of the preform 1 is inserted.

FIG. 5 illustrates that to control positioning movements of the support elements 42, two cam tracks 49, 50 are used, which are arranged one above the other in the vertical direction. The support brackets 44 are mounted on a central element 52 of the transfer wheel 41 by swivel joints 51. In the area of the swivel joints 51, the support brackets 44 have transverse links 53, which are guided along the cam track 49 by means of a cam roller 54. When the central element 52 rotates, swiveling movements of the support brackets 44 are predetermined in this way. In the illustrated embodiment, the cam rollers 54 are guided on the inside along the cam track 49. The support brackets 44 are designed to telescope and are guided along the cam track 50 with the use of a cam roller 55 to predetermine the telescoping movement of the support bracket 44. In the illustrated embodiment, the cam roller 55 is also guided on the inside along the cam track 50.

FIG. 5 shows that a movable cam segment 56 is located in the area of the cam track 50. The cam segment 56 is swiveled slightly inward and in this way lifts the cam roller 55 of the support bracket 44 that is shown in the middle in the drawing from the inside of the cam track 50. In this way, the middle support bracket 44 with its handling element 43 is located farther inward relative to an axis of rotation 57 of the transfer wheel 41 than would correspond to an operating position. This moves the handling element 43 out of the area of an intended transfer.

Figure 6:
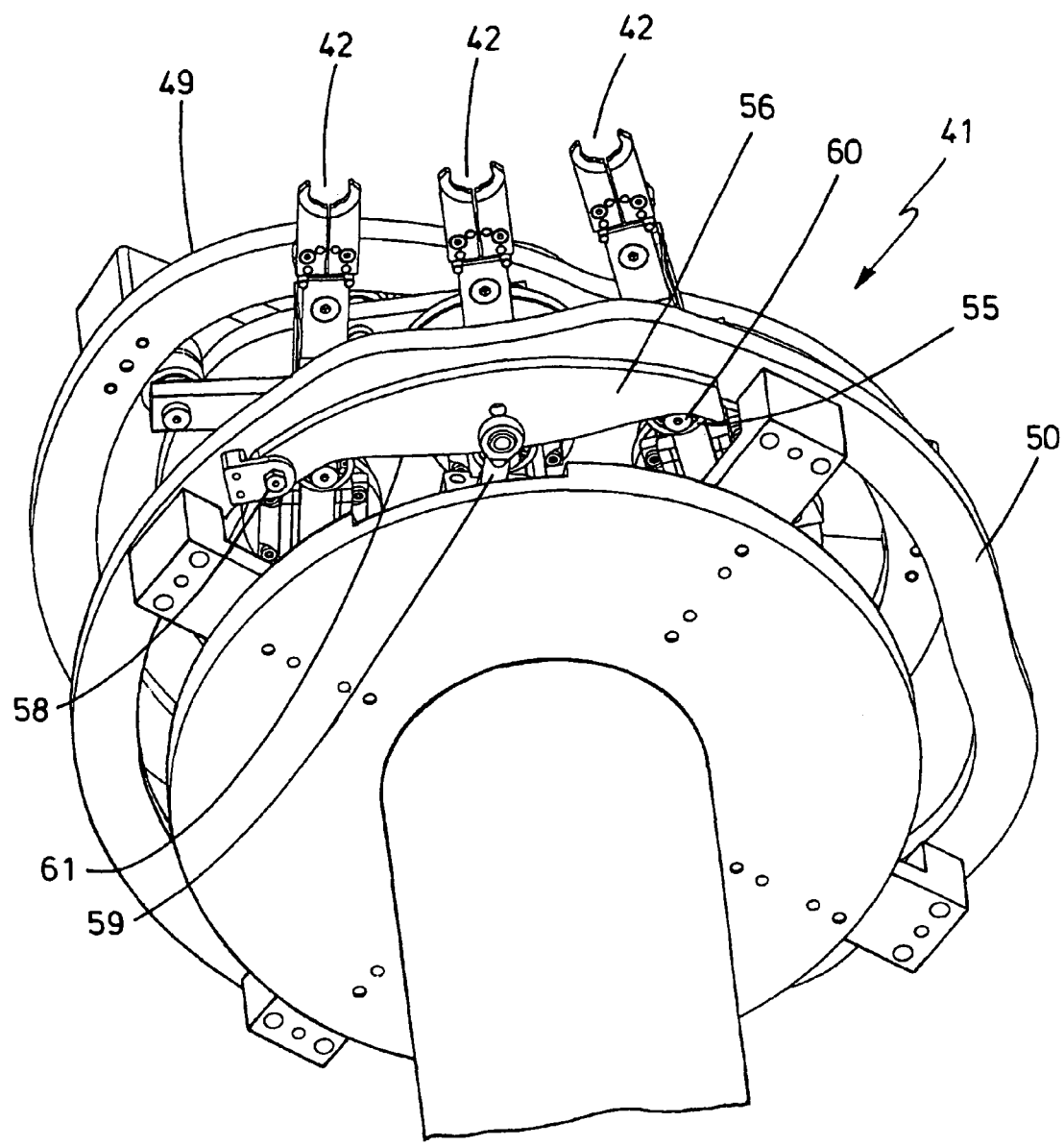
FIG. 6 shows a perspective view of the transfer wheel according to FIG. 5 obliquely from below in a decoupled position.

FIG. 6 shows the transfer wheel 41 according to FIG. 5 in a perspective view from below. In particular, the cam segment 56 is revealed. At one of its ends, the cam segment 56 is rotatably connected with the cam track 50. In addition, an actuating element 59 acts on the cam segment 56. In the embodiment illustrated here, the actuating element 59 is realized as a pneumatic cylinder. The actuating element 59 is rotatably joined with the cam segment 56. In the illustrated embodiment, the cam segment 56 is arranged vertically below the cam track 50. The support brackets 54 have receivers 60, which are provided for guidance along the cam segment 56. It is advantageous if the receivers 60 are realized as cam rollers.

In the illustrated embodiment, the receivers 60 are arranged with their axes of rotation as an extension of the cam rollers 55. This facilitates a continuous transition of the guidance of the support brackets 44 from movement of the cam rollers 55 along the cam track 50 to guidance of the receiver 60 along the cam segment 56 and also facilitates renewed contact of the cam rollers 55 on the cam track 50.

A guide contour 61 of the cam segment 56 is shaped in such a way that continuous transmission of motion is likewise supported. In particular, this also allows high speeds of rotation of the transfer wheel 41.

Figure 7:
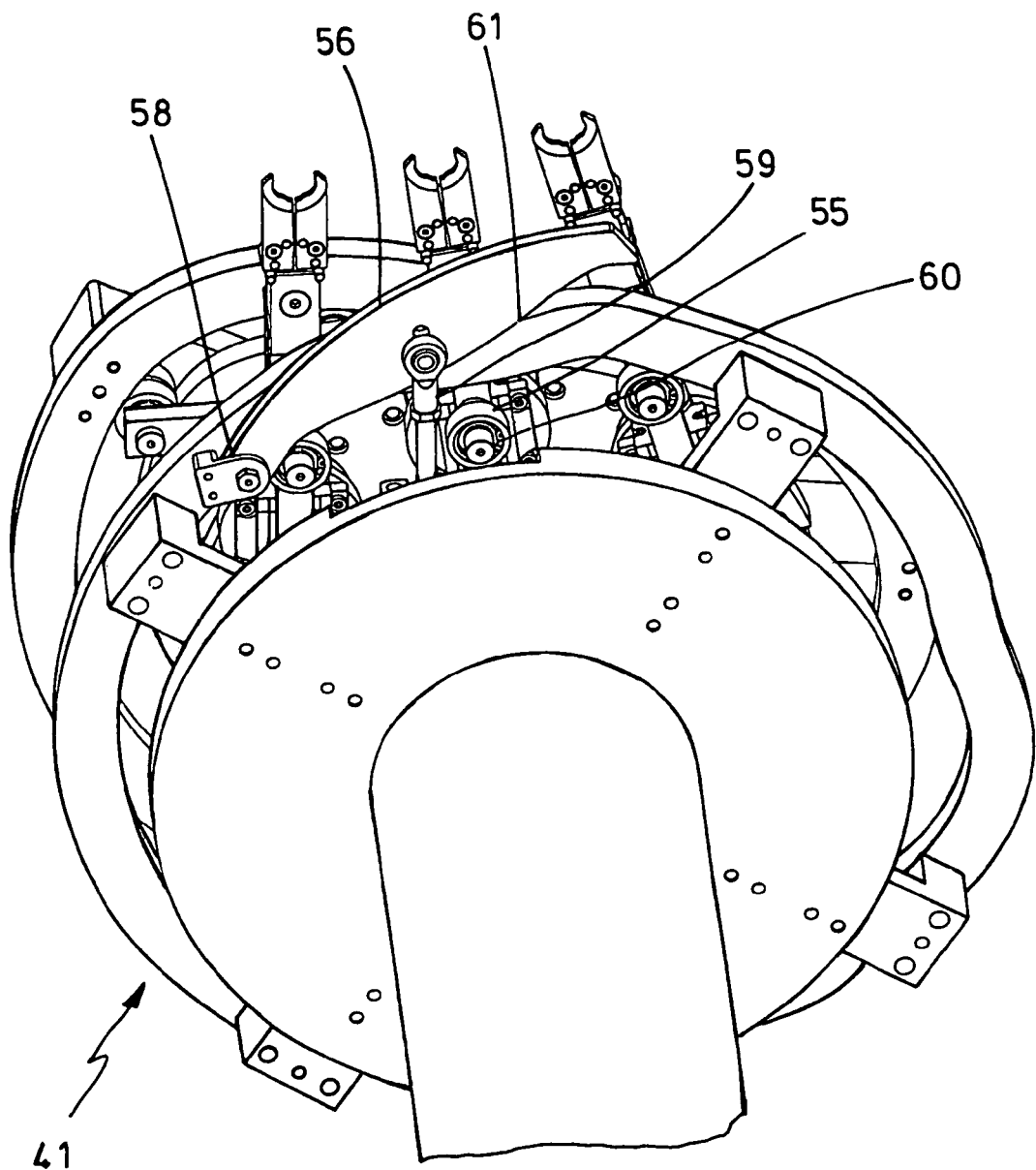
FIG. 7 shows the support wheel according to FIG. 6 in a coupled position of the support brackets.

FIG. 7 shows the transfer wheel in the view shown in FIG. 6 after the cam segment 56 has been moved into an operating position. As a result, the receiver 60 is no longer guided along the guide contour 61, and the cam roller 55 of the support bracket 55 can once again be guided along the cam track 50.

FIGS. 6 and 7 illustrate once again that the support brackets 44 run through a path of motion that deviates from the standard path of motion only in the area of the cam segment 56. This makes it possible for the intended decoupling during the performance of transfer operations to be realized with very little complexity of the equipment.

The aforementioned operating position of the support elements 42 in the rotating transfer wheel 41 is understood to be an arrangement in which the handling elements 43 of the support elements 42 are moved into at least one provided transfer region, in which they carry out a handling operation on preforms 1 or containers 2. A resting position is understood to mean that, in at least one provided transfer region, as the support elements 42 revolve, as predetermined by the transfer wheel 41, the handling elements 43 of the support elements 42 are kept away from this transfer region, so that the handling element 43 does not carry out a transfer operation provided in a standard operating sequence and is kept away from a potential collision zone.

The switching of the cam segment 56 from the operating position to the resting position and in the opposite direction can take place especially under production conditions, i.e., at full speed of the transfer wheel 41. As a result, the synchronicity of a plurality of transfer wheels 41 being used relative to one another and to other functional units is maintained.

The invention claimed is:

1. A device for blow molding containers, which has at least one blowing station with a blow mold and at least one support element for positioning preforms along a conveyance path, said support element being held by a rotating transfer wheel, relative to which the support element is movably supported, and which device has a cam control mechanism for the support element, wherein the cam control mechanism has a movable cam segment (56) that prepositions the support element (42) either in an operating position or a resting position so that, in a transfer area for containers or preforms, in the operating position transfer operations are permitted and in the resting position transfer operations are prevented, wherein the cam segment (56) is arranged at a different height level from a cam track (49, 50) of the cam control mechanism, and wherein the support element (42) has at least one cam roller (54, 55) for guidance along the cam track (49, 50) and one receiver (60) for guidance along the cam segment (56).

2. A device in accordance with claim 1, wherein the receiver (60) is designed as a cam roller.

3. A device in accordance with claim 1, wherein the cam segment (56) is coupled with an actuating element (59) for position predetermination.

4. A device in accordance with claim 1, wherein the actuating element (59) is arranged with a longitudinal axis essentially in a radial direction with respect to an axis of rotation (57) of the transfer wheel (41).

5. A device in accordance with claim 1, wherein the cam segment (56) is arranged in a way that allows it to swivel.

6. A device in accordance with claim 1, wherein the cam segment (56) is located in an initial position in a radially outward direction and in a decoupled position in a radially inward direction.

7. A device in accordance with claim 1, wherein the support element (42) is mounted in a way that allows it to swivel.

8. A device in accordance with claim 1, wherein the support element (42) is mounted in a way that allows it to telescope.

9. A device in accordance with claim 1, wherein the support element (42) is provided with a tong-like handling element (43).

10. A device in accordance with claim 1, wherein the transfer wheel (41) is provided with two positionable cam segments (56).

* * * * *